United States Patent
Moratt et al.

(10) Patent No.: US 8,483,236 B2
(45) Date of Patent: Jul. 9, 2013

(54) DYNAMIC BANDWIDTH ALLOCATION FOR MULTIPLE VIRTUAL MACS

(75) Inventors: Yoav Moratt, Haifa (IL); Oren Kaidar, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 1448 days.

(21) Appl. No.: 11/888,335

(22) Filed: Jul. 31, 2007

(65) Prior Publication Data

US 2009/0034460 A1 Feb. 5, 2009

(51) Int. Cl.
*H04L 12/43* (2006.01)

(52) U.S. Cl.
USPC ............ 370/459; 370/230; 370/329; 370/431

(58) Field of Classification Search
USPC .............. 370/229, 230, 230.1, 231, 232, 235, 370/252, 329, 348, 431, 459, 463, 477
See application file for complete search history.

(56) References Cited

U.S. PATENT DOCUMENTS

| | | | |
|---|---|---|---|
| 5,337,311 A * | 8/1994 | Herzberg et al. | 370/403 |
| 6,381,228 B1 * | 4/2002 | Prieto et al. | 370/323 |
| 7,398,020 B2 * | 7/2008 | Song et al. | 398/71 |
| 7,466,676 B2 * | 12/2008 | Gupta et al. | 370/329 |
| 2002/0126684 A1 * | 9/2002 | Findlater et al. | 370/419 |
| 2002/0131426 A1 * | 9/2002 | Amit et al. | 370/401 |
| 2003/0039211 A1 * | 2/2003 | Hvostov et al. | 370/230 |
| 2003/0189934 A1 * | 10/2003 | Jeffries et al. | 370/395.4 |
| 2004/0233912 A1 * | 11/2004 | Droz et al. | 370/395.21 |
| 2004/0264493 A1 * | 12/2004 | Han | 370/445 |
| 2005/0009545 A1 * | 1/2005 | Axelsson et al. | 455/502 |
| 2006/0182145 A1 * | 8/2006 | Seo et al. | 370/471 |
| 2006/0233169 A1 * | 10/2006 | Wang et al. | 370/389 |
| 2006/0272015 A1 * | 11/2006 | Frank et al. | 726/15 |
| 2007/0288653 A1 * | 12/2007 | Sargor et al. | 709/245 |
| 2008/0181212 A1 * | 7/2008 | Curcio et al. | 370/389 |
| 2008/0212578 A1 * | 9/2008 | Sankey et al. | 370/389 |
| 2008/0232316 A1 * | 9/2008 | Cho et al. | 370/329 |
| 2008/0240092 A1 * | 10/2008 | Moratt et al. | 370/389 |
| 2008/0259917 A1 * | 10/2008 | Hua et al. | 370/389 |

* cited by examiner

*Primary Examiner* — Kwang B Yao
*Assistant Examiner* — Nguyen Ngo
(74) *Attorney, Agent, or Firm* — Forefront IP Lawgroup, PLLC

(57) ABSTRACT

Communication bandwidth on a single physical interface (PHY) in a wireless device is allocated among multiple virtual media access control layers (MACs) based on need. Excess bandwidth may be aggregated in a single virtual. MAC for power savings.

14 Claims, 4 Drawing Sheets

DYNAMIC BANDWIDTH ALLOCATION FOR MULTIPLE VIRTUAL MACS

FIELD

The present invention relates generally to wireless networks, and more specifically to wireless network devices capable of supporting multiple virtual media access control (MAC) layers.

BACKGROUND

A wireless device may have one physical interface (PHY) that serves multiple virtual MACs. Time on the PHY may be divided equally among the virtual MACs to allow each virtual MAC to access the PHY. If one of the virtual MACs has a greater need for communications bandwidth than others, overall communications throughput may suffer.

DESCRIPTION OF EMBODIMENTS

Figure 1:
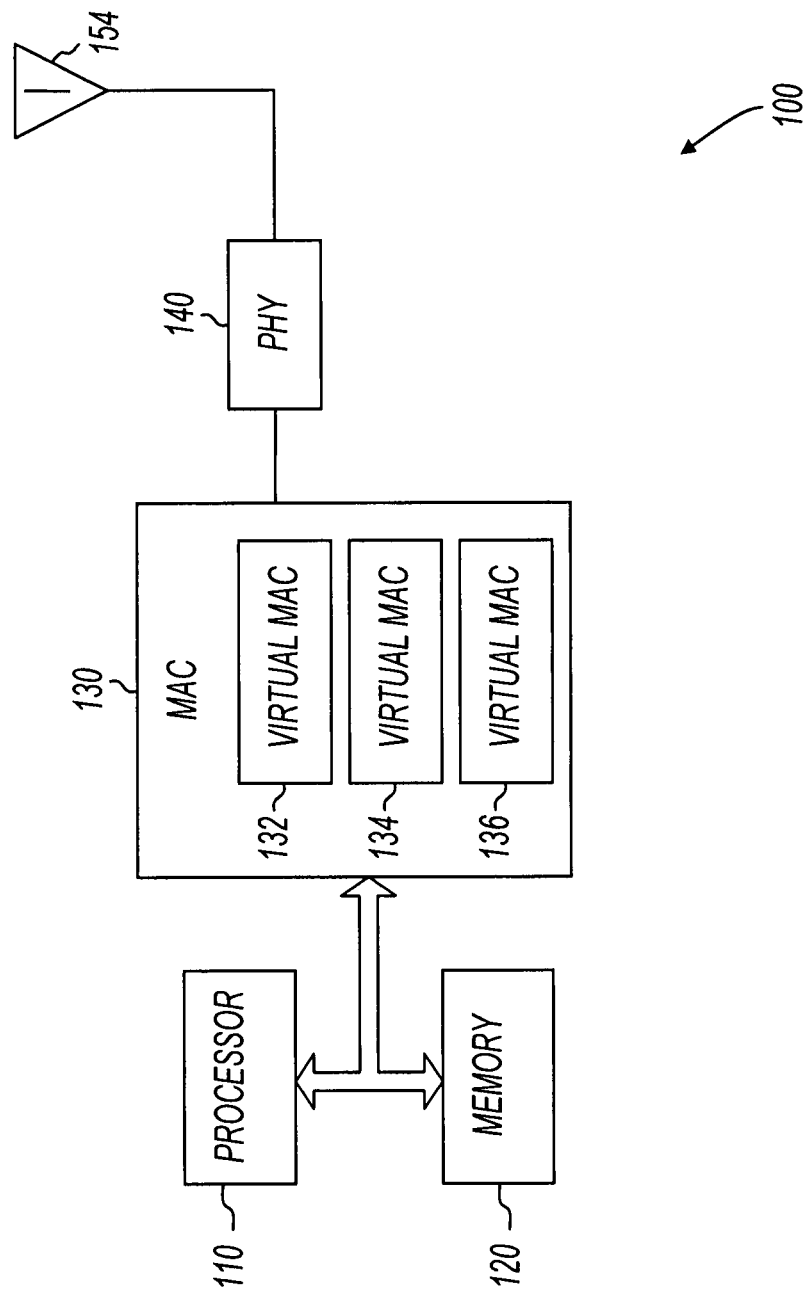
FIG. 1 shows a diagram of a wireless device with multiple virtual media access control (MAC) layers.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a wireless device with multiple virtual media access control (MAC) layers. Wireless device 100 includes antenna 154, physical layer (PHY) 140, media access control (MAC) layer 130, processor 110, and memory 120. In operation, device 100 sends and receives signals using antenna 154, and the signals are processed by the various elements shown in FIG. 1. Example devices represented by FIG. 1 include cellular phones, personal digital assistants, wireless local area network interfaces, wireless wide area network stations and subscriber units, and the like. For example, wireless device 100 may be an access point (AP) or mobile station (STA) that operates in compliance with a wireless network standard such as IEEE Std. 802.11, 1999 Edition, although this is not a limitation of the present invention. As used herein, the term "802.11" refers to any past, present, or future IEEE 802.11 standard, or extension thereto, including, but not limited to, the 1999 edition.

Antenna 154 may include one or more antennas. For example, antenna 154 may include a single directional antenna or an omni-directional antenna. As used herein, the term omni-directional antenna refers to any antenna having a substantially uniform pattern in at least one plane. For example, in some embodiments, antenna 154 may include a single omni-directional antenna such as a dipole antenna, or a quarter wave antenna. Also for example, in some embodiments, antenna 154 may include a single directional antenna such as a parabolic dish antenna or a patch antenna. In still further embodiments, antenna 154 may include multiple physical antennas. For example, in some embodiments, multiple antennas are utilized for multiple-input-multiple-output (MIMO) processing or spatial-division multiple access (SDMA) processing.

Physical layer (PHY) 140 is coupled to antenna 154 to interact with other wireless devices. PHY 140 may include circuitry to support the transmission and reception of radio frequency (RF) signals. For example, in some embodiments, PHY 140 includes amplifiers and other functional blocks to perform filtering, frequency conversion and the like.

PHY 140 may be adapted to transmit/receive and modulate/demodulate signals of various formats and at various frequencies. For example, PHY 140 may be adapted to receive time domain multiple access (TDMA) signals, code domain multiple access (CDMA) signals, global system for mobile communications (GSM) signals, orthogonal frequency division multiplexing (OFDM) signals, multiple-input-multiple-output (MIMO) signals, spatial-division multiple access (SDMA) signals, or any other type of communications signals. The various embodiments of the present invention are not limited in this regard.

Processor 110 may be any type of processor capable of communicating with memory 120, MAC 130, and other functional blocks (not shown). For example, processor 110 may be a microprocessor, digital signal processor (DSP), microcontroller, or the like.

Memory 120 represents an article that includes a machine readable medium. For example, memory 120 represents a random access memory (RAM), dynamic random access memory (DRAM), static random access memory (SRAM), read only memory (ROM), flash memory, or any other type of article that includes a medium readable by processor 110. Memory 120 may store instructions for performing software driven tasks. Memory 120 may also store data associated with the operation of device 100.

Media access control (MAC) layer 130 provides an interface between PHY 140 and higher levels in a protocol stack. MAC 130 includes multiple virtual MACs 132, 134, and 136. Although three virtual MACs are shown in FIG. 1, any number may be present without departing from the scope of the present invention. MAC 130 may be implemented in software, hardware, or any combination thereof. In some embodiments, a portion of MAC 130 may be implemented in hardware, and a portion may be implemented in software that is executed by processor 110. Further, MAC 130 may be implemented completely in software that is executed by processor 110. Still further, MAC 130 may include a processor separate from processor 110.

Wireless device 100 exposes a few virtual (logical) interfaces over the same physical radio by coupling multiple virtual MACs to one PHY. As the virtual MACs cannot transmit or receive at the same time, they are configured to share the medium bandwidth. Further, the multiple virtual MACs may operate using the same or different bandwidths, modulation type, or other protocol. For example, the multiple virtual MACs may operate in the same or separate channels. In order to be perceived as simultaneous operation of the virtual MACs, the PHY periodically switches between the MAC interfaces leaving all but one unattended. In some embodiments, bandwidth is allocated a priori to the different virtual MACs. Various embodiments of the present invention provide methods and apparatus for dynamic bandwidth allocation between multi virtual MACs over the same physical PHY.

In some embodiments, one of the virtual MACs may be designated as a primary virtual MAC while the remainder are considered non-primary. In these embodiments, the primary virtual MAC may be allocated any unused bandwidth. Various embodiments of the present invention enable un-used time allocation to be used by the primary virtual MAC for power saving.

Although the various elements of device 100 are shown separate in FIG. 1, embodiments exist that combine the circuitry of processor 110, memory 120, MAC 130, and all or a portion of PHY 140 in a single integrated circuit. In some embodiments, the various elements of system 100 may be separately packaged and mounted on a common circuit board. In other embodiments, the various elements are separate integrated circuit dice packaged together, such as in a multi-chip module, and in still further embodiments, various elements are on the same integrated circuit die.

Figure 2:
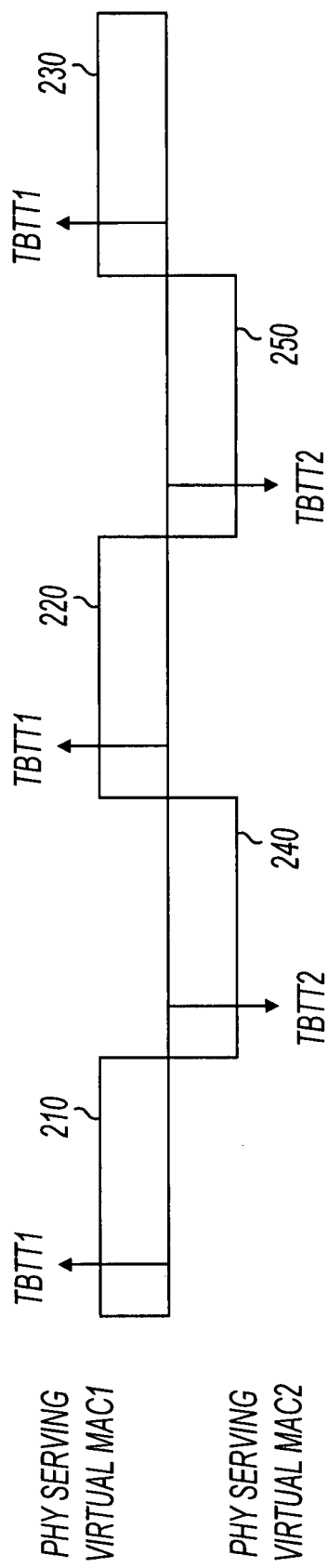
FIG. 2 shows an example bandwidth allocation between two virtual MACs.

FIG. 2 shows an example bandwidth allocation between two virtual MACs. The top portion of FIG. 2 represents bandwidth allocated to a first virtual MAC (MAC1), and the bottom portion of FIG. 2 represents bandwidth allocated to a second virtual MAC (MAC2). Although two virtual MACs are shown in FIG. 2, this is not a limitation of the present invention. For example, bandwidth may be shared between any number of virtual MACs without departing from the scope of the present invention. In some embodiments, MAC1 and MAC2 may operate on separate frequencies (channels). In other embodiments, MAC1 and MAC2 may operate on the same frequencies (channels).

At times 210, 220, and 230, the PHY is serving virtual MAC1, and at times 240 and 250 the PHY is serving virtual MAC2. During the times that the PHY is serving MAC1, the wireless device can receive a beacon at target beacon transmission time (TBTT) TBTT1 and during the times that the PHY is serving MAC2, the wireless device can receive a beacon at target beacon transmission time TBTT2. During these times, each virtual MAC may also be transmitting. The virtual MAC may be a mobile station or an access point.

The amount of communications bandwidth allocated to each of MAC1 and MAC2 is indicated by the horizontal size of the rectangles in FIG. 2. In accordance with various embodiments of the present invention, bandwidth may be dynamically allocated between the multiple virtual MAC interfaces to adjust the time division to the changing networking needs of each interface to provide the best experience; and to allocate idle time to the primary interface to allow power save.

Figure 3:
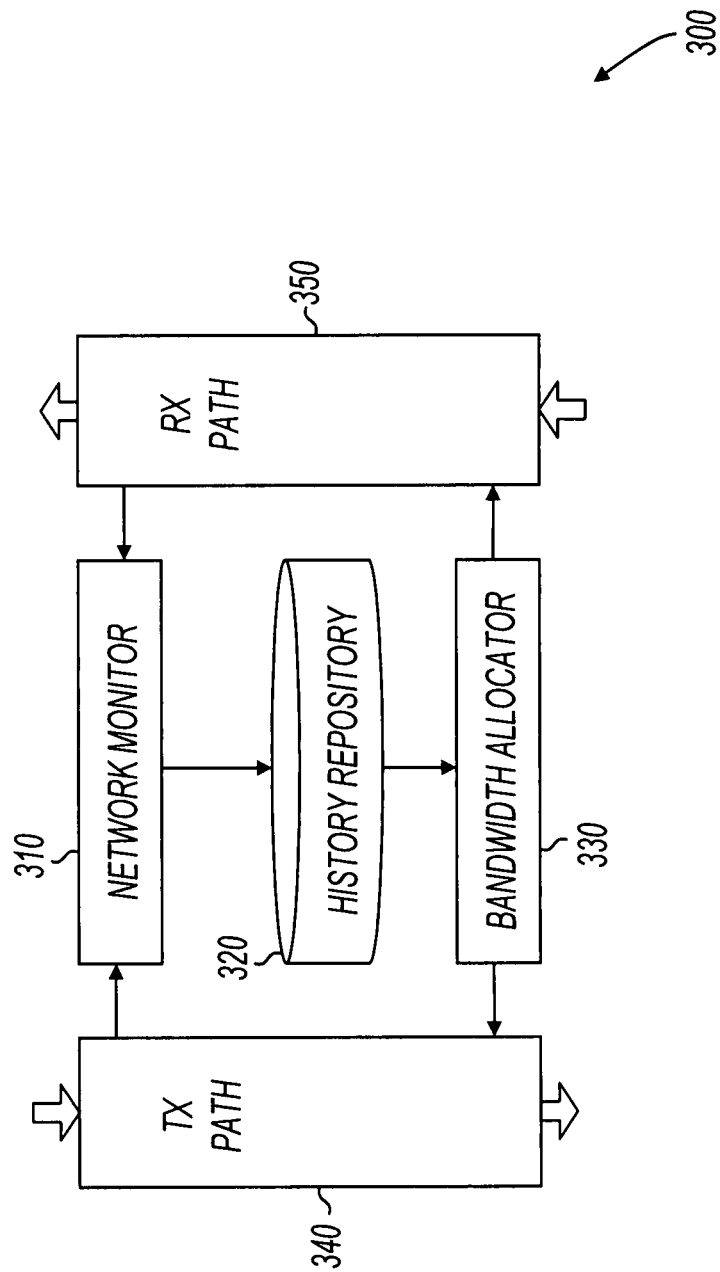
FIG. 3 shows a bandwidth allocation mechanism in accordance with various embodiments of the present invention.

FIG. 3 shows a bandwidth allocation mechanism in accordance with various embodiments of the present invention. Bandwidth allocation mechanism 300 includes a network monitor 310, history repository 320, and bandwidth allocator 330 coupled to a transmit path 340 and receive path 350.

Network monitor 310 monitors the network utilization within the allocated slot. Periodically, the monitor reports usage by each virtual MAC. For example, in some embodiments, every beacon interval the monitor reports what percentage of the allocated bandwidth was actually used by a virtual MAC. History repository 320 records the recent history samples from network monitor 310, and bandwidth allocator 330 allocates the bandwidth to each virtual MAC according to the recorded history. The history may be over one more sampling intervals. In general, the history may include any amount of information.

Bandwidth allocation mechanism 300 may be implemented within a media access control layer such as MAC 130 (FIG. 1), a physical layer such as PHY 140 (FIG. 1) or any combination. For example, network monitor 310 may operate in a MAC and bandwidth allocator 330 may operate in a PHY. The various elements of bandwidth allocation mechanism 300 may be implemented in hardware, software, or any combination. For example, network monitor 310 may be implemented in software, and history repository 320 may be implemented as data structures in a memory device. Further, bandwidth allocator 330 may be implemented in software that reads the data from history repository 320 and allocates communications bandwidth among a plurality of virtual MACs.

Figure 4:
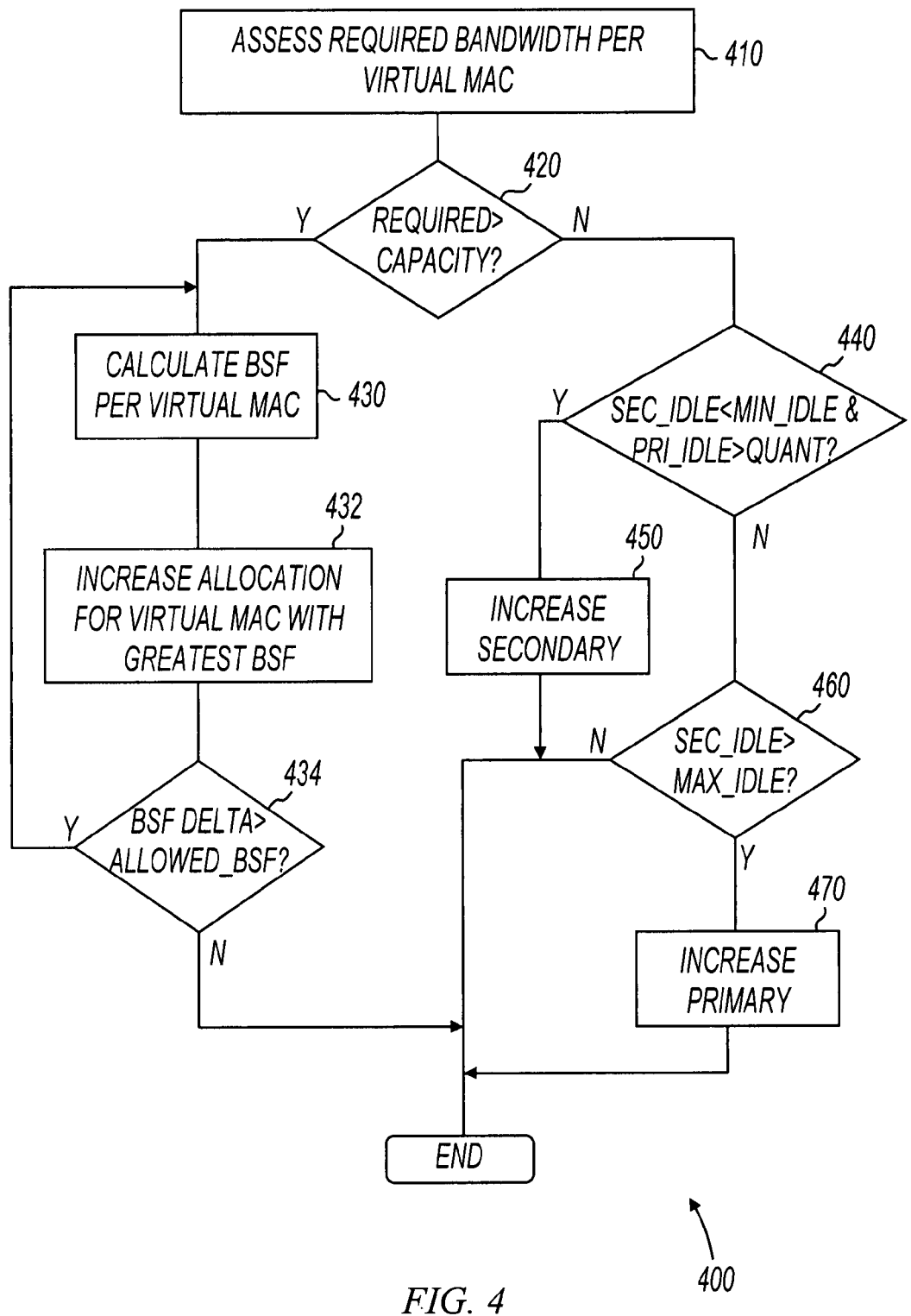
FIG. 4 shows a flowchart in accordance with various embodiments of the present invention.

FIG. 4 shows a flowchart in accordance with various embodiments of the present invention. In some embodiments, method 400, or portions thereof, is performed by an access point or wireless station in a wireless network. In other embodiments, method 400 is performed by a processor within a computer. Method 400 is not limited by the particular type of apparatus performing the method. The various actions in method 400 may be performed in the order presented, or may be performed in a different order. Further, in some embodiments, some actions listed in FIG. 4 are omitted from method 400.

Method 400 may be performed periodically or in response to a triggering event. For example, method 400 may be performed each time a beacon is received in each virtual MAC, or may be performed each time a beacon is received in a primary virtual MAC. Also for example, method 400 may be performed on a periodic basis, such as when a sampling duration is completed. Initial bandwidth allocation may be set to a value such as 10 milliseconds (ms) for each virtual MAC other than the primary virtual MAC, and the rest to the primary virtual MAC.

Method 400 is shown beginning with block 410 in which bandwidth requirements for virtual MACs are assessed according to history and open admitted streams. If required bandwidth is greater than network capacity, then weight-oriented calculations for allocation are performed starting at 430. If required bandwidth is not greater than network capacity, then requirement-oriented calculations for allocation are performed starting at 440.

The weight-oriented calculations at 430 calculate a bandwidth slot factor (BSF) as follows:

1. Let TP be the total number of packets for each 802.11 access class (AC) (both receive and transmit).
2. For each of the four access classes, let $m_i$=AIFSN+ CWMIN, where AIFSN is the Arbitration Interframe Space Number and CWMIN is the Minimum Contention Window.
3. Let n=maximum ($m_1 \ldots m_4$)
4. Let the Factor Parameter (f) for each AC be $f_i = n+1-m_i$
5. Bandwidth Slot Factor shall be calculated as BSF= $(\Sigma f_i * TP_i)/(\Sigma TP_i)$ At 432, the bandwidth allocation for the virtual MAC with the greater BSF is increased. For example, the bandwidth allocation may be increased by 5 ms-10 ms for each interval. The BSF values are calculated at 430 and allocations increased at 432 until the BSF delta between the interfaces is less then a certain value shown in FIG. 4 as Allowed_BSF.

Although the granularity of 5 ms-10 ms is used as an example, the various embodiments of the invention are not so limited. For example, bandwidth allocation changes may be in larger or smaller amounts of time.

Requirement-oriented calculations begin at 440. The requirement-oriented calculations determine how to allocate bandwidth among the multiple virtual MACs according to greatest need. At 440, for each secondary virtual MAC, if the primary virtual MAC idle time (allocated-requirement) is more than a first "quantum" (e.g., 10 ms) and the secondary virtual MAC idle time (allocated-requirement) is less then a minimum amount (MIN_IDLE) (e.g., 1-3 ms), then the bandwidth allocation for the secondary virtual MAC may be increased at 450. For example, bandwidth allocation for the secondary virtual MAC may be increased by 5 ms-10 ms at the expense of the primary virtual MAC. Bandwidth allocation changes may be more or less than 5 ms-10 ms without departing from the scope of the present invention.

At 460, for each secondary virtual MAC, if the secondary MAC's allocated time is greater than the minimum allowed+ 10 ms and its idle time (allocated-requirement) is more than a maximum allowable amount (MAX_IDLE) (e.g., 13-20 ms), then the bandwidth allocation for the primary virtual MAC may be increased at 470. For example, bandwidth allocation for the primary virtual MAC may be increased by 10 ms at the expense of the secondary virtual MAC.

MIN_IDLE, QUANT, MAX_IDLE, and ALLOWED_BSF represent thresholds to which the various parameters in method 400 may be compared. These thresholds may be set to any suitable value, and values used in the previous paragraphs are examples only.

Aggregating idle time in the primary virtual MAC may allow additional power saving by allowing the primary virtual MAC to sleep for longer periods. Dynamically changing the allocation according to the changing requirements of each interface allows for greater channel utilization as well as power savings. The dynamic nature of the bandwidth allocation allows the various embodiments of the present invention to adapt to a changing network environment.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A wireless device comprising:
   an antenna;
   a physical layer (PHY) interface coupled to the antenna;
   a media access control layer (MAC) coupled to the PHY, the MAC including multiple virtual MACs that are allocated time on the PHY; and
   a communication bandwidth allocation mechanism to allocate communication bandwidth on the PHY to the multiple virtual MACs, the communication bandwidth allocation mechanism including a network monitor that monitors PHY usage by each virtual MAC during a beacon interval, a history repository to record information provided by the network monitor, and a bandwidth allocator to allocate communication bandwidth to the multiple virtual MACs, wherein unused communication bandwidth is allocated to a primary virtual MAC.

2. The wireless device of claim 1 wherein the bandwidth allocator is configured to allocate excess bandwidth to the primary virtual MAC that is specifically designated from the multiple virtual MACs, wherein the rest of the multiple virtual MACs are designated to be secondary channels.

3. The wireless device of claim 2 wherein the network monitor is configured to count the total number of packets for both transmit and receive paths for each of the multiple virtual MACs.

4. The wireless device of claim 2 wherein the bandwidth allocator is configured to allocate excess bandwidth to a secondary virtual MAC when the primary virtual MAC has excess bandwidth and the secondary virtual MAC has excess bandwidth below a threshold.

5. The wireless device of claim 1 wherein the multiple virtual MACs operate on a single channel.

6. The wireless device of claim 1 wherein the multiple virtual MACs operate on separate channels.

7. A method comprising:
   operating a media access control layer (MAC) that includes multiple virtual MACs in a wireless device, wherein one of the multiple virtual MACs is a primary virtual MAC and others are secondary virtual MACs;
   determining if excess idle time exists when at least one of the secondary virtual MACs is operating; and
   allocating communications bandwidth on a physical interface among the multiple virtual MACs to aggregate the excess idle time in the primary virtual MAC to enable power savings.

8. The method of claim 7 further comprising determining if excess idle time exists when the primary virtual MAC is operating, and allocating communications bandwidth to a secondary virtual MAC at the expense of the primary virtual MAC.

9. The method of claim 7 further comprising determining if excess idle time exists when the primary virtual MAC is operating, and allocating communications bandwidth to a secondary virtual MAC at the expense of a different secondary virtual MAC.

10. The method of claim 7 wherein allocating communications bandwidth comprises accessing a history repository that has historical data representing communications bandwidth used by the multiple virtual MACs.

11. The method of claim 7 wherein allocating communications bandwidth comprises accessing a history repository that has historical data representing idle time used by the multiple virtual MACs.

12. The method of claim 7 wherein determining if excess idle time exists comprises counting a total number of packets on both transmit and receive paths for each of the multiple virtual MACs.

13. The method of claim 12 wherein determining if excess idle time exists further comprises comparing idle time in each of the multiple virtual MACs to a threshold.

14. The method of claim 7 further comprising if no excess idle time exists, allocating communication bandwidth among the multiple virtual MACs according to greatest need.

* * * * *